United States Patent [19]

Tamura et al.

[11] Patent Number: 5,585,483
[45] Date of Patent: Dec. 17, 1996

[54] METAL-FREE PHYTHALOCYANINE, PROCESS FOR PREPARING THE SAME, AND ELECTROPHOTOGRAPHIC PHOTOCONDUCTOR USING THE SAME

[75] Inventors: Shinichi Tamura; Seishi Terasaki; Tadashi Mimura; Teruaki Kobayashi; Youichi Tei, all of Kawasaki, Japan

[73] Assignee: Fuji Electric., Ltd., Kanagawa, Japan

[21] Appl. No.: 546,551

[22] Filed: Oct. 20, 1995

Related U.S. Application Data

[62] Division of Ser. No. 370,384, Jan. 10, 1995.

[30] Foreign Application Priority Data

Jan. 11, 1994 [JP] Japan ................................. 6-001030

[51] Int. Cl.$^6$ ................................. C09B 47/30
[52] U.S. Cl. ................... 540/122; 540/139; 540/141; 540/142
[58] Field of Search ................................. 540/122

[56] References Cited

U.S. PATENT DOCUMENTS

| | | | |
|---|---|---|---|
| 2,297,691 | 10/1942 | Carlson | 95/5 |
| 3,180,703 | 4/1965 | Ableson et al. | 23/145 |
| 3,180,729 | 4/1965 | Klupfel et al. | 96/1 |
| 3,240,597 | 3/1966 | Fox | 96/1 |
| 3,357,989 | 12/1967 | Byrne et al. | 260/314.5 |
| 3,542,544 | 11/1970 | Seus et al. | 96/1.5 |
| 3,542,546 | 11/1970 | Fox | 96/1.5 |
| 3,567,450 | 3/1971 | Brantly et al. | 96/1.5 |
| 3,615,402 | 10/1971 | Rule | 96/1.5 |
| 3,658,520 | 4/1972 | Brantly et al. | 96/1.6 |
| 3,820,989 | 6/1974 | Rule et al. | 96/1.5 |
| 4,012,376 | 3/1977 | Wright | 260/240 |
| 4,150,987 | 4/1979 | Anderson et al. | 96/1.5 R |
| 4,175,961 | 11/1979 | Wright et al. | 430/58 |
| 4,197,242 | 4/1980 | Gunther | 260/315.5 |
| 4,232,103 | 11/1980 | Limburg et al. | 430/59 |
| 4,278,747 | 7/1981 | Murayama et al. | 430/82 |

OTHER PUBLICATIONS

J. Am. Chem. Soc. 1981, vol. 103, pp. 4629–4630, "Planar, Pleated, and Saddle–Shaped Structures of the Phthalocyanine Dianion in Two Novel Multidentate Oxygen–Donor Complexes of Dipotassium Phthalocyanine", R. F. Ziolo et al.

Inorganic Chemistry, vol. 20, No. 8, 1981, pp. 2709–2711, "New Alkali Metal Phthalocyanine Complexes. Structure of the Quasi–Multimacrocycle $K_2Pc(DMF)_4$ and the $K_2Pc$ Template", Ronald F. Ziolo et al.

*Primary Examiner*—Mukund J. Shah
*Assistant Examiner*—Pavanaram K. Sripada
*Attorney, Agent, or Firm*—Spencer & Frank

[57] ABSTRACT

Phthalonitrile, an alkali metal or an alkali metal compound, and a hydrogen donor compound are heated in an organic solvent to synthesize a partially hydrogenated alkali metal phthalocyanine, which is then brought into contact with a dealkalizing agent to effect substitution with hydrogen of the partially hydrogenated alkali metal phthalocyanine to thereby obtain high-purity metal-free phthalocyanine. FX-type metal-free phthalocyanine as obtained according to the foregoing procedure may be used as a charge-generating substance to produce an electrophotographic photoconductor of high image quality which is highly sensitive to near infrared rays.

1 Claim, 3 Drawing Sheets

METAL-FREE PHYTHALOCYANINE, PROCESS FOR PREPARING THE SAME, AND ELECTROPHOTOGRAPHIC PHOTOCONDUCTOR USING THE SAME

This is a division of application Ser. No. 08/370,384 filed Jan. 10, 1995.

BACKGROUND OF THE INVENTION

1. Field of the Invention

The present invention relates to metal-free phthalocyanine having novel features, a process for preparing the same, and a high-sensitivity electrophotographic photoconductor using such metal-free phthalocyanine as a charge-generating substance and having a high sensitivity particularly to a light in the near infrared region such as a semiconductor laser radiation. The present invention further relates to novel processes for respectively preparing α-type metal-free phthalocyanine or X-type metal-free phthalocyanine.

2. Related Art

Electrophotography is an image-forming method wherein photoconductivity is skillfully combined with an electrostatic phenomenon as disclosed in U.S. Pat. No. 2,297,691 to Carlson. According to this method, the surface of a photoconductor, it's electrical conductivity increases at receiving light, is uniformly charged in the dark by corona discharge or the like, then irradiated with a light image into a manuscript or the like to turn the light image into an electrostatic latent image through utilization of the photoconductivity of the photoconductor, and then has a charged colored powder (toner) attached thereto to turn the latent image into a visible image of the toner, which is then transferred to a support such as paper and then fixed thereon to obtain an image thereon.

According to the foregoing electrophotography, digital processing of an image is possible when a manuscript image is exposed to and scanned with a light from a laser or an LED used as an exposure light source to divide the manuscript image into picture elements, pixels, and the surface of a photoconductor is then exposed to and scanned with a light while using the pixels as the units of the light. Further, printout of information is possible when the surface of a photoconductor is exposed to and scanned with light dots changed from the output of an information processing apparatus. In view of the foregoing, high-speed optical printers and digital copiers of high image quality utilizing electrophotography have recently rapidly come into wide use in keeping with the rapid advance and increasing speed of information processing. Particularly in the case of using a semiconductor laser as a light source, apparatuses of the kind as mentioned above can be miniaturized, decreased in cost, and increased in reliability and image quality. Thus, apparatuses using a semiconductor laser as the light source thereof have attracted attention. Accordingly, active research and development of a photoconductor having a sensitivity to a semiconductor laser radiation are under way. Since the oscillation wavelength of a semiconductor laser now in practical use is limited to comparatively long wavelengths in the near infrared region, a photoconductor for use in an apparatus using a semiconductor laser as the exposure light source thereof is required to have a high photosensitivity to a light having a long wavelength in the near infrared region. Further, such a photoconductor is required to be free of a fluctuation in electrical properties, a fluctuation in output images, and memorization even when used in a variety of environments as well as repeatedly used.

Conventional charge-generating substances known as those sensitive to the oscillation wavelength of a semiconductor laser include polyazo pigments, phthalocyanine pigments, azulenium salt pigments, pyrilium salt pigments, and naphthoquinone pigments. However, the naphthoquinone pigments are comparatively low in sensitivity, the polyazo pigments are difficult to synthesize stably, and the azulenium salt pigments and the pyrilium salt pigments are easy of a change in photoelectric properties in relation to humidity. Further, these pigments disadvantageously are so unstable in an aspect of chemical structure when exposed to a strong light such as a laser radiation that a difficulty has been experienced in putting them into practical use. On the other hand, the phthalocyanine pigments are chemically and physically stable pigments as have been used as coloring pigments in inks, paints, etc., and it has moreover been known since the discovery thereof that they have properties as organic semiconductors. It has further been known that the absorption wavelength and photoconductive properties of a phthalocyanine pigment are greatly varied depending on the kind of central metal thereof, the crystal form thereof and the method of treatment thereof. From these standpoints, the phthalocyanine pigments have widely been studied because the discovery of a phthalocyanine pigment having a high sensitivity to a light in the long wavelength region has been expected.

Metal phthalocyanines known as charge-generating substances include s-type copper phthalocyanine, chloroaluminum phthalocyanine (AlPcCl), titanyl phthalocyanine (TiOPC), and chloroindium phthalocyanine (InPcCl). However, ε-type copper phthalocyanine, though stable as a substance, is unsatisfactory in sensitivity to the semiconductor laser radiation, while chloroaluminum phthalocyanine and chloroindium phthalocyanine each having a central metal bonded to a halogen atom disadvantageously are unstable to water and hence changeable in electrical properties. On the other hand, titanyl phthalocyanine, though excellent in sensitivity to a light in the long wavelength region, involves such problems that a difficulty is encountered not only in stably securing a crystal form excellent in properties but also in stably maintaining such a crystal from for a long period of time, and that titanium oxide, which is an n-type semiconductor, formed as a by-product from titanium chloride or a titanium alkoxide as a starting material of synthesis of titanyl phtalocyanine is hardly removed therefrom.

On the other hand, since metal-free phthalocyanine is also a chemically and physically stable compound as can be understood from the use thereof as a pigment like copper phthalocyanine, it has been studied as a charge-generating substance like metal phthalocyanines. Known crystal forms of metal free phthalocyanine include thermodynamically unstable α-type and β-type, thermodynamically stable β-type, and a variety of other types. Since α-, β- and γ-type crystal forms of metal-free phthalocyanine are insufficient in sensitivity to a light in the near infrared region involving the oscillation wavelength of a semiconductor laser, research and development have been made with a view to investigating other crystal forms of metal-free phthalocyanine, examples of which include X-type metal-free phthalocyanine as disclosed in U.S. Pat. No. 3,357,989, τ-type metal-free phthalocyanine as disclosed Japanese Patent Application Laying-open No 182,639, γ'-type metal-free phthalocyanine as disclosed in Japanese Patent Application Laying-open No. 87,332/1985, high-purity X-type metal-free phthalocyanine different in crystal habit as disclosed in Japanese Patent Application Laying-open No. 243,089/

1985, metal-free phthalocyanine as disclosed in Japanese Patent Application Laying-open No. 47,054/1987, and metal-free phthalocyanine as disclosed in Japanese Patent Application Laying-open No. 233,769/1990.

In an aspect of properties, X-type metal-free phthalocyanine is one of representative crystal forms of metal-free phthalocyanine first expected to be applied to photoconductors for laser printers. U.S. Pat. No. 3,357,989 discloses a process for preparing such X-type metal-free phthalocyanine, wherein a commercially available starting material is dissolved in sulfuric acid and then precipitated in iced water to obtain purified α-type metal-free phthalocyanine, which is then milled. The above-mentioned U.S. Patent specification also discloses that as many hours as 48 to 168 hours of ball milling of the purified α-type metal-free phthalocyanine are required to obtain X-type metal-free phthalocyanine in the case of using a ball mill in the foregoing process (see "Comparative Example 4" in the U.S. Patent specification), while 2 hours of milling of the purified α-type metal-free phthalocyanine enable X-type metal-free phthalocyanine to be obtained in the case of using a speck mixer mill in the foregoing process. The speck mixer mill is however a small milling apparatus for a dentist, and the use thereof is therefore unsuitable in an industrial process. Since the process for preparing X-type metal-free phthalocyanine as disclosed in U.S. Pat. No. 3,357,989 is impractical, various processes for preparing X-type metal-free phthalocyanine have heretofore been studied. For example, Japanese Patent Application Publication No. 8,102/1970 discloses a process wherein α-type metal-free phthalocyanine is mixed with an organic aliphatic vehicle in the presence of a minor part of seed crystals of X-type metal-free phthalocyanine to be mostly converted into X-type metal-free phthalocyanine. According to this process, however, a difficulty is encountered in stably obtaining X-type crystal because β-type crystals are obtained in many cases as demonstrated in Comparative Example 1 as will be described later. On the other hand, Japanese Patent Application Publication No. 42,511/1971 discloses a process wherein a phthalonitrile derivative is reacted in an ammonia-saturated alkylalkanolamine solvent in the presence of seed crystals of X-type metal-free phthalocyanine to synthesize X-type metal-free phthalocyanine. According to this process, however, the conversion into X-type crystal is only about 70% in Examples in the above-mentioned Japanese Patent Publication specification. As described hereinbefore, a difficulty has been experienced in easily and stably obtaining X-type metal-free phthalocyanine.

On the other hand, τ-type metal-free phthalocyanine is prepared by effecting wet milling of α-type metal-free phthalocyanine together with a grinding assistant such as sodium chloride and an inactive solvent such as ethylene glycol at a temperature of 50° C. to 180° C., preferably 50° C. to 180° C., for 5 hours to 20 hours, thus making the processing thereof complicated and difficult. Therefore, a difficulty is encountered in stably securing a constant crystal form of τ-type metal-free phthalocyanine. The preparation of τ-type metal-free phthalocyanine also involves similar disadvantages. As for the high-purity X-type metal-free phthalocyanine different in crystal habit as disclosed in Japanese Patent Application Laying-open No. 243,089/1985, removal of a strong base used as a catalyst is difficult to make the product unstable in properties, and the method of preparation thereof is very complicated and hence impractical, as described in Japanese Patent Application Laying-open No. 233,769/1990, the application of which was filed by the same applicant as in Japanese Patent Application Laying-open No. 243,089/1985. As for the metal-free phthalocyanine as disclosed in Japanese Patent Application Laying-open No. 47,054/1987, it is prepared by firstly preparing X-type metal-free phthalocyanine and then treating the same with a nonpolar organic solvent such as tetrahydrofuran, thus involving not only problems of long-time steps and a high production cost but also a demerit of an insufficient sensitivity of the product because of a large particle size thereof resulting from the growth of primary particles through the treatment thereof with the solvent. As for the metal-free phthalocyanine as disclosed in Japanese Patent Application Laying-open No. 233,769/1990, it is pointed out in Japanese Patent Application Laying-open No. 328,170/1992, application of which was filed by the same applicant as in Japanese Patent Application Laying-open No. 233,769/1990, that it has an insufficient sensitivity and involves a demerit that the residual potential thereof is greatly increased through repeated use thereof.

Thus, metal-free phthalocyanines known to date involve some demerits such as a difficulty in stable preparation thereof on an industrial scale, an insufficient sensitivity, and an instability in electrical properties thereof. Most of these defects are attributed to the influences of impurities in metal-free phthalocyanine. More specifically, the presence of a large amount of such impurities entails a problem that necessary crystal conversion is hard to effect stably and perfectly. Further, charge carriers generated upon reception of a light are entrapped in the impurities and imperfect portions of crystals to bring about a lowering of the sensitivity of metal-free phthalocyanine, a fluctuation in electrical properties thereof through repeated used thereof, and a delay in time constant, which are causative of memorization as well as a change in the density of an output image.

From these standpoints, methods of purification of metal-free phthalocyanine are under energetic study with an eye to improving the properties thereof as a charge-generating substance.

Most general methods of preparing metal-free phthalocyanine, as disclosed on page 153 in Moser and Moser "Phthalocyanine Compound" [ACS Monograph No. 157; Reinhold Publishing Corp., New York (1963)] and U.S. Pat. No. 3,357,989, are a so-called acid pasting method wherein pigment phthalocyanine is dissolved in sulfuric acid and the resulting solution is brought into contact with water to precipitate phthalocyanine again, and a sublimation method wherein pigment phthalocyanine is sublimed under reduced pressure. The sublimstion method is excellent in purification of phthalocyanine, but unsuitable for industrial production thereof because the throughput thereof cannot be increased. On the other hand, according to the acid pasting method, for example, side reactions such as decomposition of metal-free phthalocyanine with sulfuric acid occur, complete removal of sulfate ions is difficult, and impurities are left in and between crystal particles of phthalocyanine because of very rapid re-precipitation of dissolved phthalocyanine with water, thus involving a difficulty in sufficient purification of phthalocyanine.

As the method of avoiding a decomposition reaction with sulfuric acid as well as the method of avoiding residual sulfate ions, there can be mentioned methods wherein metal-free phthalocyanine is once converted into a solvent-soluble metal phthalocyanine or phthalocyanine complex and insoluble impurities in a solvent are then removed through filtration, followed by reversion thereof to the original metal-free phthalocyanine to thereby effect purification thereof. More specifically, according to a first method of the kind as described above, metal-free phthalocyanine is converted into dilithium phthalocyanine, which is then dissolved in an alcohol, and the resulting solution is filtered to remove therefrom impurities such as insoluble through filtration and then admixed with water, a dilute aqueous solution of a mineral acid, carbon dioxide gas, dry ice or the like to decompose the dilithium phthalocyanine into the original metal-free phthalocyanine. According to a second method of the kind as described above, metal-free phthalocyanine is converted into dipotassium phthalocyanine and formed into a complex with a solvent to effect solubilization thereof in a solvent, and then purified in substantially the same manner as in the first method to effect reversion of the complex to the original metal-free phthalocyanine. Known examples of such a complex include a dipotassium phthalocyanine-dicrown ether complex as disclosed in J. Am. Chem. Soc., 103, 4629 (1981); dipotassium phthalocyanine-DMSO complex as disclosed in U.S. Pat. No. 4,197,242; and dipotassium phthalocyanine-DMF complex as disclosed in Inorg. Chem. 20, 2709 (1981). Methods of preparing X-type metal-free phthalocyanine using metal-free phthalocyanine highly purified according to either of these methods are disclosed in Japanese Patent Application Laying-open No. 243,089/1985 and Japanese Patent Application Laying-open No. 115,085/1986. However, such solubilization-in-solvent methods involve a problem that they are very complicated in the production steps, and hence substantially impractical. Furthermore, dilithium phthalocyanine and dipotassium phthalocyanine complexes, though soluble in a solvent, are not so high in solubility that a large amount of the solvent must disadvantageously be used to increase the production cost. Moreover, impurities such as inorganic ions remain in the resulting product.

Meanwhile, the aforementioned crystal forms sensitive to a light in the near infrared region are all meta-stable crystal forms positioned between the α-type as a thermodynamically unstable crystal form and the β-type as a thermodynamically stable crystal form. In general, crystal form conversion hardly proceeds from a thermodynamically stable crystal form into a thermodynamically unstable crystal form. The crystal conversion of metal-free phthalocyanine from the β-type as a stable crystal form hardly proceeds toward a meta-stable crystal form, which is a thermodynamically more unstable crystal form, and a considerable amount of β-type crystals remains in the product even if it proceeds toward the more unstable crystal form, thus failing to provide good results for the product as a charge-generating substance. In view of the foregoing, synthesized and purified β-type metal-free phthalocyanine is once converted into an unstable α-type or γ-type crystal form, which is then converted into the desired semi-stable crystal form. Since such conversion of β-type crystals into α-type or γ-type crystals is usually effected according to the aforementioned acid pasting method as described in connection with purification of the phthalocyanine, however, there arises a problem that a decomposition by-product of metal-free phthalocyanine, sulfate ions, etc. remain in the product metal-free phthalocyanine. Other known methods include a method wherein phthalocyanine is sublimed in high vacuum at a low temperature, a method wherein β-type crystal is converted into α-type crystal by a mechanical shear applied thereto with a ball mill or the like at a low temperature, and a method wherein phthalocyanine is synthesized in a lower alcohol at a low temperature of at most 70° C. However, the sublimation method cannot be employed on an industrial scale, while the conversion method using the mechanical strain involves a problem that complete conversion into α-type crystal is difficult to leave a considerable amount of β-type crystal, and the low-temperature synthesis method involves demerits such as a large amount of impurities remaining in the product, and a low yield. On the other hand, Japanese Patent Application Laying-open No. 115,085/1986 discloses in Example 3 that the layer of dipotassium phthalocyanine-didigylme complex is treated with a 5% aqueous solution of hydrochloric acid to obtain α-type metal-free phthalocyanine. However, this method involves substantially the same problem as described in connection with the above-mentioned acid pasting method.

As described hereinbefore, the organic charge-generating substances sensitive to a light with a wavelength in the near infrared region such as the semiconductor laser radiation include the phthalocyanine compounds. However, the conventional phthalocyanine compounds as have been known to date involve various problems with the purity thereof, the method of preparation thereof, and the processing thereof. Thus, no phthalocyanine compound well satisfactory in properties as a charge-generating substance has been obtained yet.

SUMMARY OF THE INVENTION

The present invention has been made in view of the foregoing. Accordingly, a first object of the present invention is to provide a phthalocyanine compound having a high sensitivity to a light with a wavelength in the near infrared region. A second object of the present invention is to provide a process for easily and stably preparing a phthalocyanine compound of the kind as described above. A third object of the present invention is to provide a photoconductor of high image quality suitable for use in an electrophotographic apparatus using a light with a wavelength in the near infrared region such as the semiconductor laser radiation, and capable of forming output images free of defects such as a variation in the density thereof, a memory and a ghost. A further object of the present invention is to provide a novel process for preparing high-purity α-type metal-free phthalocyanine as well as X-type metal-free phthalocyanine.

The above-mentioned first object can be attained by providing metal-free phthalocyanine characterized in that the infrared absorption spectrum thereof includes four absorption bands with the maximum absorption intensity at a wavenumber of 716 $cm^{-1}$ between a wavenumber of 700 $cm^{-1}$ and a wavenumber of 760 $cm^{-1}$ and a characteristic absorption band at a wavenumber of 3,291±2 $cm^{-1}$, and in that the X-ray diffraction spectrum thereof as measured using CuKα as a radiation source includes intense diffraction peaks at Bragg angles 2θ (tolerance: ±2°) of 7.5°, 9.0°, 16.6°, 17.2°, 21.5°, 22.2°, 23.8°, and 28.5° (hereinafter referred to as "FX-type metal-free phthalocyanine").

Such FX-type metal-free phthalocyanine can be prepared by heating phthalonitrile, an alkali metal or an alkali metal compound, and a hydrogen donor compound in an organic solvent to synthesize a partially hydrogenated alkali metal phthalocyanine ($H_nM_{2-n}Pc$; wherein H stands for a hydrogen atom; M stands for a monovalent alkali metal selected from among lithium, potassium, and sodium; n is represented by the formula: 0<n<2; and Pc stands for phthalocyanine), subsequently bringing the product into contact with a dealkalizing agent (agent for substituting an alkali metal with hydrogen) to obtain metal-free phthalocyanine, and then milling the metal-free phthalocyanine.

In the step of synthesizing the partially hydrogenated alkali metal phthalocyanine, a member selected from the group consisting of oxygen, carbon dioxide gas, water, lower alcohols, and mixtures thereof may be brought into contact with a di-alkali metal phthalocyanine being synthesized under such conditions that the di-alkali metal phthalocyanine can be synthesized. According to this method, the two alkali metals of the di-alkali metal phthalocyanine may be partially substituted with hydrogen to efficiently synthesize the partially hydrogenated alkali metal phthalocyanine.

Further, the above-mentioned partially hydrogenated alkali metal phthalocyanine may be subjected to a dealkalization reaction (reaction for substituting an alkali metal with hydrogen) in the presence of a member selected from the group consisting of lower alcohols, oxygen, acid gases, and water at a temperature of 130° C. to 170° C. According to this method, the aforementioned FX-type metal-free phthalocyanine can be directly obtained without taking other crystal form midway of the preparation thereof.

The FX-type metal-free phthalocyanine thus obtained can be used as a charge-generating substance to produce a photoconductor for electrophotography of high image quality which is capable of forming output images free of defects such as variation in the density thereof, a memory and a ghost, and suitable for use in an electrophotographic apparatus using a light with a wavelength in the near infrared region such as the semiconductor laser radiation.

On the other hand, when the partially hydrogenated alkali metal phthalocyanine is subjected to a dealkalization reaction in the presence of a member selected from the group consisting of lower alcohols, oxygen, acid gases, and water at a temperature of 130° C. to 170° C. as described above, the dealkalization reaction may be effected in the presence of seed crystals of X-type metal-free phthalocyanine to obtain high-purity X-type metal-free phthalocyanine.

Further, the partially hydrogenated alkali metal phthalocyanine may be brought into contact with a solvent comprising water or a lower alcohol as the main component at a temperature of at moat 120° C., preferably at moat 100° C., to effect a dealkalization reaction thereof to thereby obtain high-purity α-type metal-free phthalocyanine.

FX-type metal-free phthalocyanine according to the present invention can be easily differentiated from metal-free phthalocyanines as have been known to date according to the following comparison. Specifically, τ-type metal-free phthalocyanine is characterized in that the X-ray diffraction spectrum thereof as measured using CuKα as a radiation source includes diffraction peak at Bragg angles of 7.2°, 9.2°, 16.8°, 17.4°, 20.4°, and 20.9°, and four absorption bands with the maximum absorption intensity at a wavenumber of $752\pm2$ cm$^{-1}$ between a wavenumber of 700 cm$^{-1}$ and a wavenumber of 760 cm$^{-1}$, two absorption bands with mutually substantially equal absorption intensities between a wavenumber of 1,320 cm$^{-1}$ and a wavenumber of 1,340 cm$^{-1}$, and an absorption band at a wavenumber of $3,288\pm2$ cm$^{-1}$. Thus, the FX-type crystal form and the τ-type crystal form can be differentiated from each other because no mutually common diffraction peaks exist at Bragg angles of 20.9°, 21.5°, 22.2°, 23.8°, and 28.5° in the X-ray diffraction spectra thereof, and because the position of the maximum absorption peak between a wavenumber of 700 cm$^{-1}$ and a wavenumber of 760 cm$^{-1}$ in infrared absorption spectrum is different between the two crystal forms and the position of the absorption peak at a wavenumber of around 3,291 cm$^{-1}$ in the infrared absorption spectrum of the FX-type crystal form is different from that at a wavenumber of around 3,288 cm$^{-1}$ in the infrared absorption spectrum of the τ-type crystal form. Next, the X-type metal-free phthalocyanine as disclosed in U.S. Pat. No. 3,357,989 is defined as being characterized in that the X-ray diffraction spectrum thereof as measured using CuKα as a radiation source includes diffraction peaks at Bragg angles of 7.5°, 9.1°, 16.7°, 17.3°, and 22.3°, and in that the infrared absorption spectrum thereof includes an intense absorption peak at a wavenumber of 746 cm$^{-1}$ and absorption peaks with mutually equal absorption intensities between a wave-number of 700 cm$^{-1}$ and a wave-number of 750 cm$^{-1}$. However, the X-ray diffraction spectrum of this X-type metal-free phthalocyanine lacks diffraction peaks at Bragg angles of 21.5°, 23.8°, and 28.5° characteristic of FX-type metal-free phthalocyanine. The diffraction spectrum of FX-type metal-free phthalocyanine includes the diffraction peak at a Bragg angle of 28.5° in particular, which is more intense and clear than the diffraction peak at a Bragg angle of 17.2°. In contrast to this, the former peak is not defined with respect to the X-type metal-free phthalocyanine in the above mentioned U.S. Patent specification, and the X-ray diffraction spectrum thereof shown in the above-mentioned U.S. Patent specification includes no diffraction peak at a Bragg angle of 28.5° even without any sign of appearance of such a diffraction peak at around the above-mentioned Bragg angle. Further, the principal diffraction peaks in the X-ray diffraction spectrum of the X-type metal-free phthalocyanine which may substantially correspond to those of the FX-type metal-free phthalocyanine are shifted in the direction of lower Bragg angles in the X-ray diffraction spectrum of the FX-type metal-free phthalocyanine. This demonstrates that the distances between the lattice planes in the real crystal lattice of the FX-type metal-free phthalocyanine are shorter than those of the X-type metal-free phthalocyanine. This, coupled with the observation of more clear diffraction peaks of the FX-type metal-free phthalocyanine more in number than those of the X-type metal-free phthalocyanine, substantiates that the FX-type metal-free phthalocyanine is higher in crystallinity than the X-type metal-free phthalocyanine. This demonstrates that charge carriers in the crystal of FX-type metal-free phthalocyanine are little prevented from migrating by scattering and trapping thereof due to the lattice defect of the crystal, and that FX-type metal free phthalocyanine is therefore excellent as a photosemiconductor. Further, regarding the infrared absorption spectrum, the intense absorption peak of the X-type metal-free phthalocyanine does not appear at all at a wave-number of 746 cm$^{-1}$ as can be seen in the infrared absorption spectrum of the FX-type metal-free phthalocyanine. On the other hand, the absorption peak at a wavenumber of 754 cm$^{-1}$ as can be seen in the infrared absorption spectrum of the FX-type metal-free phthalocyanine does not appear at all in the infrared absorption spectrum of the X-type metal-free phthalocyanine. These facts also clearly indicate that both types of metal-free phthalocyanine are different from each other. Further, the X-type metal-free phthalocyanine as disclosed in Japanese Patent Application Laying-open No. 328,170/1992 is characterized in that the X-ray diffraction spectrum thereof as measured using CuKα as a radiation source includes diffraction peaks at Bragg angles of 7.4°, 9.0°, 16.5°, 17.2°, 22.1°, 23.8°, 27.0°, and 28.4°, and further substantially includes two diffraction peaks between a Bragg angle of 21° and a Bragg angle of 25°. However, no diffraction peak at a Bragg angle of 27.0° is observed in the X-ray diffraction spectrum of the FX-type metal-free phthalocyanine, while the diffraction peak at a Bragg angle of 21.5° as can be seen in the X-ray diffraction spectrum of the FX-type metal-free phthalocyanine is not observed in the X-ray diffraction spectrum of this X-type metal-free phthalocyanine. On the other hand, the metal-free phthalocyanine as disclosed in Japanese Patent Laid-Open No. 47,054 is characterized in that the X-ray diffraction spectrum thereof includes principal diffraction peaks at Bragg angles of 7.7°, 9.3°, 16.9°, 17.6°, 22.4°, and 28.8°. This metal-free phthalocyanine is different altogether from FX-type metal-free phthalocyanine because both are not in common with each other in respect of most diffraction peaks.

The FX-type metal-free phthalocyanine according to the present invention can be obtained through the aforementioned crystal conversion of high-purity metal-free phthalocyanine. Furthermore, FX-type metal-free phthalocyanine can also be obtained directly without taking other crystal form midway of the preparation thereof.

High-purity metal-free phthalocyanine may be obtained by bringing a partially hydrogenated alkali metal phthalocyanine (alakli metal phthalocyanine partially substituted with hydrogen and represented by the formula: $H_nM_{2-n}Pc$; wherein H stands for hydrogen; M stands for a monovalent alkali metal selected from among lithium, potassium,-and sodium; n is represented by the formula: $0<n<2$; and Pc stands for phthalocyanine) into contact with a hydrogen-substituting agent.

Methods of preparing crystals of a partially hydrogenated alkali metal phthalocyanine include a method wherein phthalonitrile is heated in an organic solvent in the presence of a hydrogen donor compound and an alkali metal source, and a method wherein formation of a di-alkali metal phthalocyanine is followed by bringing the di-alkali metal phthalocyanine into contact with a suitable amount of a hydrogen-substituting agent to substitute part of the alkali metal in the phthalocyanine with hydrogen.

Compounds having active hydrogen, organic reducing agents, etc. are usable as the hydrogen donor compound, specific examples of which include compounds having active hydrogen, including amide compounds such as formamide, acetamide and N-methylacetamide; amines such as ammonia, monoethylamine, diethylamine, n-butylamine, n-tributylamine, isobutylamine, diisobutylamine, sec-butylamine, n-amylamine, diamylamine, triamylamine, 2-ethylhexylamine, dioctylamine, ethylenediamine, cyclohexylamine, dicyclohexylamine and diethylbenzylamine; alkylalkanolamines such as 2-dimethylaminoethanol, monoethanolamine, diethanolamine, triethanolamine, ethylmonoethanolamine, n-butyldiethanolamine, di-n-butylethanolamine, triisopropanolamine and isopropanolamine; alcohols such as n-amylalcohol, tert-amylalcohol and hexylalcohol; polyhydric alcohol such as ethylene glycol, diethylene glycol and glycerol, and morpholine; and organic reducing agents such as hydroquinone.

Examples of the alkali metal source include simple alkali metal such as lithium, sodium, and potassium; and hydroxides, alkoxides, amides and hydrides of alkali metals as mentioned above. They may be used either alone or in appropriate mixture.

The molar ratio of the alkali metal source to phthalonitrile is preferably in the range of ½ to 1/20, further preferably in the range of ¼ to ⅜. The amount of the hydrogen donor compound is appropriately determined depending on the reactivity thereof in such a way as to efficiently obtain the desired partially hydrogenated alkali metal phthalocyanine. Meanwhile, where the alkali metal source is reacted with the solvent to generate hydrogen, or where the alkali metal source, like sodium hydride, serves in itself a hydrogen donor compound as well, the partially hydrogenated alkali metal phthalocyanine can be formed without particular use of a hydrogen donor compound. In such cases, use of the hydrogen donor compound may, of course, be dispensed with.

Phthalonitrile and the hydrogen donor compound, if any, are heated in the organic solvent in the presence of the alkali metal source at a temperature of at least 120° C. As for the solvent used in the reaction, a starting material to be used may be used as the solvent in some cases where it serves in itself as a kind of solvent. In general, any solvent may be used in so far as it is such a solvent as is commonly used in the synthesis of phthalocyanine. Examples of the solvent include aromatic solvents such as trichlorobenzene, nitrobenzene, and alpha-chloronaphthalene; dimethylformamide; N-methyl-2-pyrrolidone; dimethyl sulfoxidei and sulfolane.

According to the method of synthesizing a partially hydrogenated alkali metal phthalocyanine after the synthesis of a di-alkali metal phthalocyanine, phthalonitrile is firstly heated together with at least ½ mol, based on phthalonitrile, of the alkali metal source in the organic solvent in the absence of any hydrogen donor compound to form the di-alkali metal phthalocyanine, which is then reacted with the hydrogen-substituting agent to obtain the partially hydrogenated alkali metal phthalocyanine.

Here, the degree of hydrogen substitution in the partially hydrogenated alkali metal phthalocyanine ($H_nM_{2-n}PC$) is preferably closer to 1 in the range: $0<n<2$. When the degree of hydrogen substitution is low, i.e., when the value of n is low, the amount of the solvent-soluble di-alkali metal phthalocyanine is increased to lower the yield of the desired product because the di-alkali metal phthalocyanine is flowed away together with the solvent in the step of filtration after the reaction. On the other hand, when the value of n is high, a long period of time is required for obtaining a high-purity crystal. Accordingly, a mono-alkali metal phthalocyanine with $n=1$ is most preferred.

The partially hydrogenated alkali metal phthalocyanine thus obtained is brought into contact with the hydrogen-substituting agent to obtain high-purity metal-free phthalocyanine according to the present invention. Examples of the hydrogen-substituting agent include lower alcohols such as methanol and ethanol, water, and mineral acids such hydrochloric acid. Here, the contact of the partially hydrogenated alkali metal phthalocyanine with the hydrogen-substituting agent may be effected either in a synthesis system wherein the former has been synthesized, or in a system separate from the above-mentioned synthesis system. From the standpoint of decreasing the amount of impurities as much as possible, however, the above-mentioned contact is preferably effected after the partially hydrogenated alkali metal phthalocyanine is separated from the reaction system to thereby remove therefrom the unreacted starting materials. Additionally stated, the hydrogen substitution reaction is desirably effected very slowly because rapid hydrogen substitution is liable to have impurities entrapped in a metal-free phthalocyanine precipitate. For this reason, it is preferable to adopt a method wherein the partially hydrogenated alkali metal phthalocyanine is brought into contact with the hydrogen-substituting agent either in a gaseous state or in the form of a solution of the hydrogen-substituting agent diluted with an inactive solvent while string the solution.

The purity of the metal-free phthalocyanine obtained in the foregoing manner was as high as at least 98% even without carrying out the acid pasting thereof.

The inventors of the present invention have found out that various crystal forms of metal-free phthalocyanine can be obtained depending on conditions as employed during the course of conversion of the above-mentioned partially hydrogenated alkali metal phthalocyanine into metal-free phthalocyanine. Specifically, the α-type crystal form is obtained at a temperature of at most 120° C. and the β-type crystal form is obtained at a temperature of at least 190° C., while the FX-type crystal form is directly obtained at a temperature of 130° C. to 170° C. The X-type crystal form is obtained in the presence of X-type seed crystal at a temperature of 130° C. to 170° C. In this case, the amount of the X-type seed crystal is preferably at least 0.5 wt. % based on the resulting metal-free phthalocyanine.

High-purity α-type crystal of metal-free phthalocyanine obtained in the foregoing manner was milled in the presence of a mechanical shear applied thereto to obtain FX-type metal-free phthalocyanine excellent in electrophotographic properties as well.

Examples of an apparatus for application of such a mechanical strain include an attritor, a ball mill, a stamp mill, a planetary mill, a vibration mill, and a kneader. Additionally stated, the α-type crystal may be either those prepared according to a direct synthesis method or those prepared by acid pasting of metal-free phthalocyanine prepared according to the above-mentioned method of the present invention.

The photoreceptor of the present invention wherein the FX-type metal-free phthalocyanine obtained according to the foregoing procedure is used as a charge-generating substance is a so-called function-separated laminate type of photoconductor having a laminated structure comprising at least a charge generation layer and a charge transfer layer both laminated on an electroconductive substrate.

The electroconductive substrate may be made of any material in so far as it is endowed with an electroconductivity. Thus, various materials can be used. The form of the electroconductive substrate is not particularly limited, example of which include a plate, a sheet, and a cylinder. Usable examples of the electroconductive substrate include metal drums as well as metal sheets of aluminum, vanadium, nickel, copper, zinc, palladium, indium, tin, platinum, stainless steel, chromium, brass, etc.; metallized or laminated plastic sheets with such a metal metallized or laminated thereon; and plastic drums as well as plastic sheets made of a material containing an electroconductive material dispersed in an electroconductive plastic material or a plastic material.

If necessary, a layer called a blocking layer and/or an undercoating layer may further be provided between the electroconductive substrate and the charge generation layer for the purpose of preventing charge injection from the substrate and/or improving the adhesion to each other. Known examples of such a layer include layers made of a metal oxide such as alumite; layers made of a coating film-forming polymer resin such as a polyamide, e.g., nylon R 6, nylon R 66, nylon R 11, nylon R 610, a copolymerized nylon R or an alkoxymethylated nylon R, casein, polyvinyl alcohol, an ethylene-acrylic acid copolymer, gelatin, or polyvinyl butyral; and layers made of a resin containing electroconductive, semiconductive or dielectric particles dispersed therein, examples of which include metal oxides such as zinc oxide, titanium oxide and aluminum oxide, and silicon nitride, silicon carbide, and carbon black.

The charge generation layer is formed by dispersing the FX-type metal-free phthalocyanine of the present invention as a charge-generating substance in a solution of a binder dissolved in a solvent, and applying the resulting liquid dispersion on the substrate. The charge-generating substance is not necessarily limited to only the FX-type metal-free phthalocyanine, which may therefore be used in combination with another charge-generating substance, examples of which include various crystal forms of metal-free phthalocyanine; various metal phthalocyanines wherein the metal may be copper, titanium, indium, gallium, magnesium, or the like; bisazo compounds, triazo compounds; anthraquinone compounds; perylene compounds; perynone compounds; azulenium salt compounds; squarylium salt compounds; and pyrrolopyrrole compounds. The binder that may be suitably used in the present invention is a hydrophobic and highly electrical insulting film-forming polymer or copolymer. Specific examples of the binder include phenolic resins, polyester resins, vinyl acetate resins, polycarbonate resins, polypeptide resins, cellulosic resins, polyvinyl pyrrolidone, polyethylene oxide, polyvinyl chloride resins, polyvinylidene chloride resins, polystyrene resins, polyvinyl acetate, styrene-butadiene copolymers, vinylidene chloride-acrylonitrile copolymers, vinyl chloride-vinyl acetate copolymers, vinyl chloride-vinyl acetate-maleic anhydride copolymers, silicone-alkyd resins, phenol-formaldehyde resins, styrene-alkyd resins, polyvinyl alcohol, acrylic copolymer resins, methacrylic copolymer resins, silicone resins, methacrylonitrile copolymer resins, and polyvinyl butyral. They may be used either alone or in mixture.

The charge transfer layer is a layer comprising a substance capable of positive hole transfer. A variety of positive hole-transferring substances or compounds as have been known to date can be used, examples of which include hydrazone compounds as disclosed in U.S. Pat. No. 4,150,987, U.S. Pat. No. 4,278,747, West German Patent Laid-Open No. 2,939,483, British Patent Laid-Open No. 2,034,493, European Patent Laid-Open No. 13,172, etc.; pyrazoline compounds as disclosed in Japanese Patent Application Laying-open No. 105,536/1974; oxadiazole compounds as disclosed in Japanese Patent Application Laying-open No. 112,637/1979; styryl compounds as cited in Japanese Patent Application Laying-open No. 31,733/1975; arylamine compounds as U.S. Pat. No. 3,567,450, Japanese Patent Publication No. 35,702/1974, West German Patent No. 1,110,518, U.S. Pat. No. 3,180,703, U.S. Pat. No. 3,240,597, U.S. Pat. No. 3,658,520, U.S. Pat. No. 4,232,103, U.S. Pat. No. 4,175,961, U.S. Pat. No. 4,012,376, Japanese Patent Application Laying-open No. 144,250/1980, Japanese Patent Application Laying-open No. 119,132/1981, and Japanese Patent Application Publication No. 27,577/1964; oxazole compounds as disclosed in U.S. Pat. No. 3,542,546; pyrazoline or pyrazolone compounds as disclosed in U.S. Pat. No. 3,180,729 and Japanese Patent Application Laying-open No. 105,536/1974; polyarylalkane compounds as disclosed in U.S. Pat. No. 3,615,402, U.S. Pat. No. 3,820,989, U.S. Pat. No. 3,542,544, Japanese Patent Application Publication No. 555/1970, and Japanese Patent Application Publication No. 10,983/1976; polyvinylcarbazole and derivatives thereof as disclosed in Japanese Patent Application Publication No. 10,966/1959; an N-acrylamidomethylcarbazole polymer as disclosed in Japanese Patent Application Laying-open No. 85,337/1975; a 6-vinylindolo(2,3-6)quinoxaline polymer as disclosed in Japanese Patent Application Laying-open No. 93,432/1975; vinyl polymers as disclosed in Japanese Patent Application Publication No. 18,674/1968, and Japanese Patent Application Publication No. 19,192/1968; triphenylmethane polymers as disclosed in Japanese Patent Application Laying-open No. 90,883/1981 and Japanese Patent Application Laying-open No. 161,550/1981; styrene copolymers, polyacenaphthene, polyindene, and acenaphthene-styrene copolymers as disclosed in Japanese Patent Application Publication No. 19,193/1968; and formaldehyde condensate resins as disclosed in Japanese Patent Application Publication No. 13,940/1981. Where the positive hole-transferring substance itself has coating film-forming properties, it may be used in the form of a solution thereof to be formed into a charge transfer layer by application of the solution. On the other hand, where the positive hole-transferring substance itself has no coating film-forming properties because it is a low-molecular-weight compound, it is dissolved together with a resin having coating film-forming properties in a solvent to prepare a solution thereof, which is then applied to form a charge transfer layer. The thickness of the charge transfer layer may be in the range of 5 μm to 40 μm.

The foregoing various layers may be formed using a coater as is usually known, such as a dip coater, a spray coater, a wire bar coater, an applicator, a doctor blade, a roller coater, a curtain coater, or a bead coater.

The above and other objects, effects, features and advantages of the present invention will become more apparent from the following description of embodiments thereof taken in conjunction with the accompanying drawings.

BRIEF DESCRIPTION OF THE DRAWINGS

FIGS. 1A and 1B are diagrams of the X-ray diffraction spectrum of FX-type metal-free phthalocyanine, wherein

DETAILED DESCRIPTION OF PREFERRED EMBODIMENTS

The inventors of the present invention have found out a method of highly purifying metal-free phthalocyanine, according to which impurities entrapped in crystals and between strongly aggregate particles thereof, which impurities are said to be most difficult to remove from a phthalocyanine, are dissolved away when the phthalocyanine is in an equilibrium condition between dissolution and precipitation thereof, whereby the purity of the resulting metal-free phthalocyanine is increased. They have further found out that suitable examples of such a phthalocyanine are solvent-soluble partially hydrogenated alkali metal phthalocyanines, among which mono-alkali metal phthalocyanines are especially preferable, and that, when the conditions of the alkali metal elimination reaction of such a partially hydrogenated alkali metal phthalocyanine are controlled, α-type metal-free phthalocyanine, a semi-stable X-type crystal form of metal-free phthalocyanine, and the aforementioned FX-type crystal form of metal-free phthalocyanine according to the present invention can be purified even without using sulfuric acid. The present invention has been completed based on these findings.

In general, the removal of impurities in an organic substance is effected according to the recrystallization method. The recrystallization method is a purification method wherein molecular-level dissolution and precipitation of an organic substance in a solvent are repeatedly effected by once dissolving the organic substance in the solvent, and subsequently adding a poor solvent to the resulting solution or lowering the temperature of the solution to expel little by little the impurities contained in the organic substance by making advantage of a difference in solubility in the solvent between the organic substance and the impurities. In the foregoing recrystallization method, high-speed precipitation of crystals of the organic substance is causative of entrapment of the impurities in the precipitated crystals or between aggregate particles of the crystals to deteriorate the degree of purification of the organic substance. Thus, the crystals of the organic substance are basically required to be precipitated as slowly as possible. In the case of a common phthalocyanine compound, however, the recrystallization method cannot be adopted because such a compound is hardly soluble in an organic solvent. On the other hand, dilithium phthalocyanine, dipotassium phthalocyanine, etc. solubilized in a solvent, though capable of being rid of solvent-insolubles, involve a problem that impurities dissolved in the solvent are entrapped in crystals of metal-free phthalocyanine or between crystal aggregate particles thereof during the course of precipitation of the metal-free phthalocyanine to hardly effect sufficient purification thereof because the conversion reaction of dilithium phthalocyanine, dipotassium phthalocyanine, etc. into metal-free phthalocyanine according to the aforementioned conventional method is very rapid. In other words, the conventional phthalocyanine compounds involve a problem of lacking a state of being purified little by little through the molecular-level dissolution and precipitation thereof being repeatedly effected in the steps of the recrystallization method.

While focusing their attention on the fact that metal-free phthalocyanine is insoluble in a solvent whereas di-alkali metal phthalocyanines are soluble in a solvent, the inventors of the present invention have found out that mono-alkali metal phthalocyanines having an intermediate structure therebetween have an appropriate solubility in a solvent. In view of the fact that fine particles of a mono-alkali metal phthalocyanine were increased in particle size when heated in an organic solvent, they have further confirmed a phenomenon of molecular-level dissolution and reprecipitation of the mono-alkali metal phthalocyanine in the organic solvent such as N-methyl-2-pyrrolidone. In view of the fact that metal-free phthalocyanine and a di-alkali metal phthalocyanine were also detected in a solution of the mono-alkali metal phthalocyanine, they have still further found out that the dissolution and precipitation of the mono-alkali metal phthalocyanine can be repeatedly effected in the solvent thanks to a condition of equilibrium of the mono-alkali metal phthalocyanine between the metal-free phthalocyanine and the di-alkali metal phthalocyanine in the solvent. Specifically, it has been elucidated that, when the metal-free phthalocyanine coexists with the di-alkali metal phthalocyanine, the mono-alkali metal phthalocyanine is also yielded in the solvent in an equilibrium condition as mentioned above, with the result that impurities entrapped in crystals or between aggregate particles of the crystals are pushed out therefrom to obtain a high-purity mono-alkali metal phthalocyanine purified substantially through recrystallization thereof; and that high-purity metal-free phthalocyanine can be obtained through substitution with hydrogen of the alkali metal of the high-purity mono-alkali metal phthalocyanine obtained in the foregoing manner. It has still further been found out that a high-purity phthalocyanine containing no substantial impurities in the precipitated crystals thereof can surprisingly be obtained when the phthalocyanine is synthesized from phthalonitrile under such conditions that a mono-alkali metal phthalocyanine can be precipitated.

The inventors of the present invention have still further found out that, when appropriate hydrogen substitution conditions are chosen in the step of substituting the alkali metal of the mono-alkali metal phthalocyanine with hydrogen, not only α-type metal-free phthalocyanine can be obtained even without using sulfuric acid, but also X-type metal-free phthalocyanine and FX-type metal-free phthalocyanine having a novel crystal form can be obtained directly in the step of synthesizing the same even without application thereto of a physical impact. It has still further been found out that such high-purity metal-free phthalocyanine obtained in the foregoing manner may be subjected to crystal conversion under a physical impact force, shear or strain being applied thereto to obtain FX-type metal-free phthalocyanine having a novel crystal form.

The following Examples will illustrate the present invention in more detail, but should not be construed as limiting the scope of the invention. In Examples, the term "part" or "parts" stands for "part by weight" or "parts by weight" while "%" stands for "wt . %." Firstly, a description will be made of Examples wherein metal-free phthalocyanine according to the present invention was prepared.

EXAMPLE 1

Preparation of α-Type Metal-Free Phthalocyanine

A four-necked flask equipped with a stirrer, a cooling pipe, a thermometer, and a gas-introducing pipe was charged with 512 parts of phthalonitrile, 15 parts of cyclohexylamine, and 1,000 parts of N-methyl-2- pyrrolidone. Thereafter, 56 parts of sodium methoxide were added little by little to the charged mixture at room temperature. Subsequently, the resulting mixture was heated and stirred in an atmosphere of nitrogen at 195° C. for 8 hour. Thereafter, the contents of the flask were cooled to 120° C., and then filtered still in a hot state thereof. Subsequently, the residue was washed with 500 parts of dimethylformamide, and then further washed with acetone until the filtrate became transparent. Subsequently, the product was dispersed in 1,000 parts of methanol under stirring at room temperature. The resulting dispersion was filtered to remove the methanol. Subsequently, the resulting blue solid substance was dispersed in 2,000 parts of a 1% aqueous solution of sodium hydroxide. The resulting dispersion was heated, and then filtered. The residue was washed with water. Subsequently, the residue was washed again with 2,000 parts of a 1% aqueous solution of hydrochloric acid in substantially the same manner as described above in connection with the use of the 1% aqueous solution of sodium hydroxide, and then dried. According to the foregoing procedure, there were obtained 335 parts of metal-free phthalocyanine in the form of a blue powder having a purity of 98.5% and exhibiting an X-ray diffraction pattern of an α-type crystal form. Additionally stated, it was found out that the contents of the flask must be cooled to a temperature of at most 120° C., and should desirably be cooled to a temperature of at most 100° C.

EXAMPLE 2

Preparation of FX-Type Metal-Free Phthalocyanine

Figure 1A:
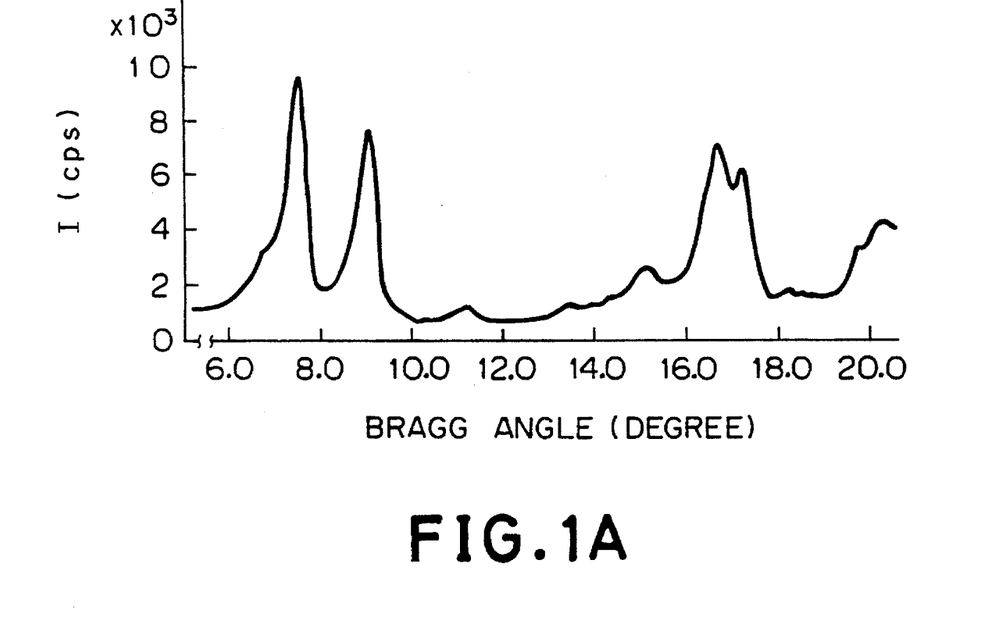
FIG. 1A is a diagram of the spectrum in the Bragg angle range of lower than 20° and FIG. 1B is s diagram of the spectrum in the Bragg angle range of at least 20°.
Figure 1B:
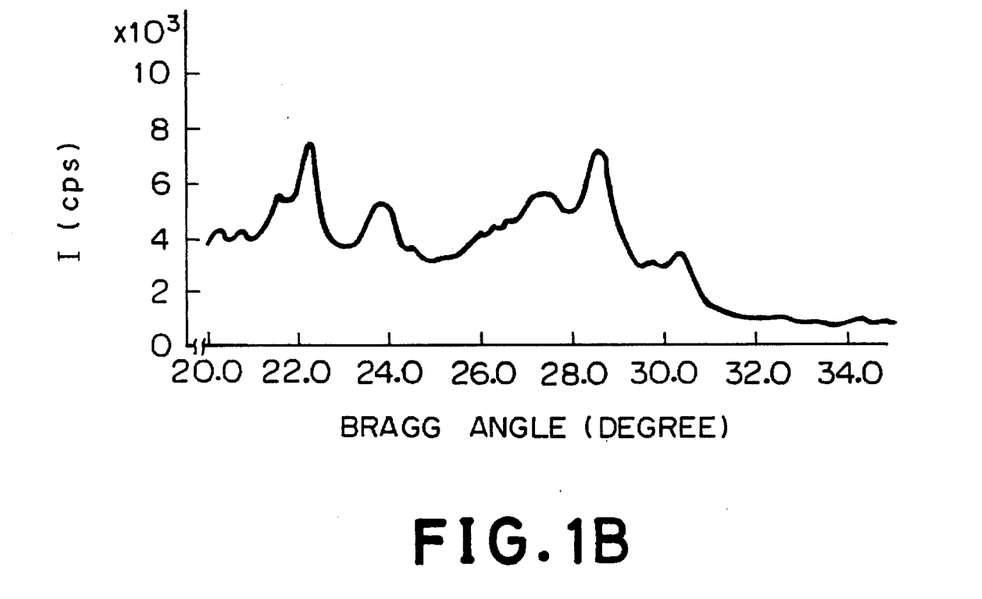
Figure 2:
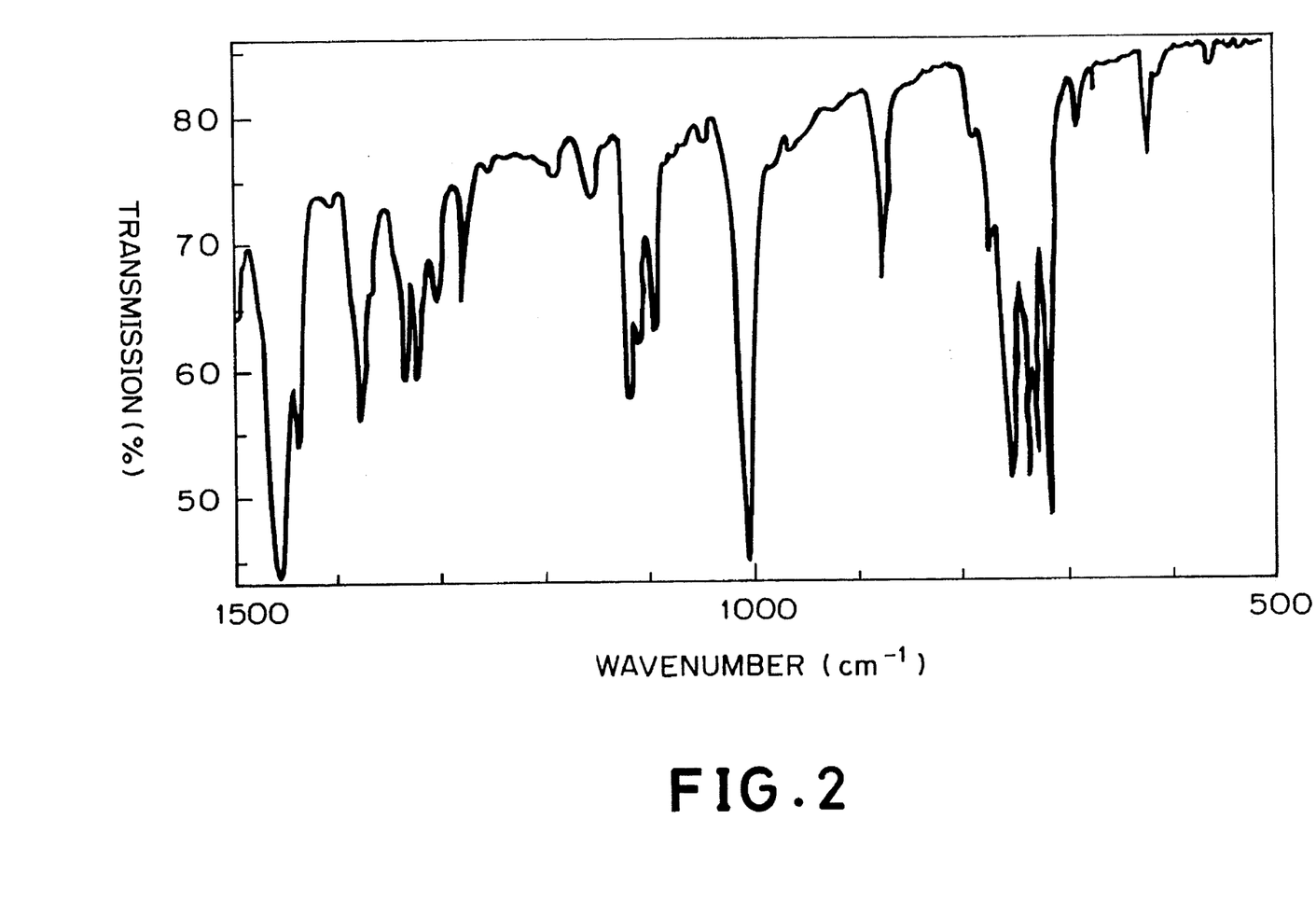
FIG. 2 is a diagram of the infrared absorption spectrum of FX-type metal-free phthalocyanine.

The α-type metal-free phthalocyanine obtained in Example 1 was milled with a ball mill for 15 hours. The collected metal-free phthalocyanine exhibited intense diffraction peaks at Bragg angles of 7.5°, 9.0°, 16.6°, 17.2°, 21.5°, 22.2°, 23.8°, and 28.5° in the X-ray diffraction spectrum thereof as shown in FIG. 1, and exhibited four absorption bands with the maximum absorption intensity at a wavenumber of 716 cm$^{-1}$ between a wavenumber of 700 cm$^{-1}$ and a wavenumber of 760 cm$^{-1}$ as shown in FIG. 2 and further a characteristic absorption band at a wavenumber of 3,291±2 cm$^{-1}$, though not shown in FIG. 2, in the infrared absorption spectrum thereof as measured in the form of a nujol mull thereof. Thus, it was found out that FX-type metal-free phthalocyanine according to the present invention could be obtained.

EXAMPLE 3

Preparation of FX-Type Metal-Free Phthalocyanine in One Stage of Synthesis

A four-necked flask equipped with a stirrer, a cooling pipe, a thermometer, and a gas-introducing pipe was charged with 512 parts of phthalonitrile, 30 parts of formamide, and 1,000 parts of N-methyl-2-pyrrolidone. Thereafter, 56 parts of sodium methoxide were added little by little to the charged mixture at room temperature. Subsequently, the resulting mixture was heated and stirred in an atmosphere of nitrogen at 160° C. for 8 hours. Thereafter, the reaction was further continued at 160° C. for 4 hours while introducing air passed through methanol into the flask. That is, methanol was contacted with di-alkali metal phthalocyanine being synthesized under such conditions that the di-alkali metal phtalocyanine can be synthesized. Thereafter, the contents of the flask were cooled to 120° C., and then filtered still in a hot state thereof. Subsequently, the residue was washed with 500 parts of dimethylformamide, and then further washed with acetone until the filtrate became transparent. Subsequently, the product was dispersed in 1,000 parts of methanol under attiring at room temperature. The resulting dispersion was filtered to remove the methanol. Subsequently, the resulting blue solid substance was dispersed in 2,000 parts of a 1% aqueous solution of sodium hydroxide. The resulting dispersion was heated, and then filtered. The residue was washed with water. Subsequently, the residue was washed again with 2,000 parts of a 1% aqueous solution of hydrochloric acid in substantially the same manner as described above in connection with the use of the 1% aqueous solution of sodium hydroxide, and then dried. According to the foregoing procedure, there were obtained 320 parts of FX-type metal-free phthalocyanine in the form of a blue powder exhibiting the same X-ray diffraction spectrum and the same infrared absorption spectrum as in Example 2 only in one stage of synthesis.

EXAMPLE 4

Preparation of X-Type Metal-free Phthalocyanine in One Stage of Synthesis

A four-necked flask equipped with a stirrer, a cooling pipe, a thermometer, and a gas-introducing pipe was charged with 512 parts of phthalonitrile, 100 parts of formamide, and 1,000 parts of N-methyl-2-pyrrolidone. Thereafter, 56 parts of sodium methoxide were added little by little to the charged mixture at room temperature. Subsequently, the resulting mixture was heated and stirred in an atmosphere of nitrogen at 160° C. for 8 hours. Subsequently, 20 parts of X-type metal-free phthalocyanine obtained in Comparative Example 4 as will be described later were fed into the flask. Thereafter, the reaction was further continued at 160° C. for 4 hours while introducing air passed through methanol into the flask. Thereafter, the contents of the flask were cooled to 120° C., and then filtered still in a hot state thereof. Subsequently, the residue was washed with 500 parts of dimethylformamide, and then further washed with acetone until the filtrate became transparent. Subsequently, the product was dispersed in 1,000 parts of methanol under stirring at room temperature. The resulting dispersion was filtered to remove the methanol. Subsequently, the resulting blue solid substance was dispersed in 2,000 parts of a 1% aqueous solution of sodium hydroxide. The resulting dispersion was heated, and then filtered. The residue was washed with water. Subsequently, the residue was washed again with 2,000 parts of a 1% aqueous solution of hydrochloric acid in substantially the same manner as descried above in connection with the use of the 1% aqueous solution of sodium hydroxide, and then dried. According to the foregoing procedure, there were obtained 340 parts of metal-free phthalocyanine in the form of a blue powder exhibiting an X-ray diffraction pattern of an X-type crystal form only in one stage of synthesis.

For comparison, a description will now be made of Comparative Examples wherein a variety of conventional metal-free phthalocyanine was prepared.

COMPARATIVE EXAMPLE 1

Preparation of β-Type Metal-Free Phthalocyanine 512 part of phthalonitrile were added to 1,000 parts of N-methyl-2-pyrrolidone. The resulting mixture was heated at 130° C. to 150° C., and then admixed with 45 parts of cyclohexylamine. The resulting solution was further heated to 190° C. while stirring the same. The reaction mixture firstly turned yellowish brown, and then turned green. Thereafter, formation of metal-free phthalocyanine crystals began. The reaction mixture was further kept at a temperature of 190° C. to 200° C. for a period of time of 12 hours to 14 hours to complete the reaction, then allowed to cool to 125° C., and then filtered still in a hot state thereof. Subsequently, the product was dispersed in 1,000 parts of methanol under stirring at room temperature. The resulting dispersion was then filtered to remove the methanol. Subsequently, the resulting blue solid substance was dispersed in 2,000 parts of a 1% aqueous solution of sodium hydroxide. The resulting dispersion was heated, and then filtered. The residue was washed with water. Subsequently, the residue was washed again with 2,000 parts of a 1% aqueous solution of hydrochloric acid in substantially the same manner as described above in connection with the use of the 1% aqueous solution of sodium hydroxide, and then dried. According to the foregoing procedure, there were obtained 350 parts of metal-free phthalocyanine in the form of a blue powder exhibiting an X-ray diffraction pattern of a β-type crystal form.

COMPARATIVE EXAMPLE 2

Preparation of α-Type Metal-Free Phthalocyanine

α-type metal-free phthalocyanine was prepared from the β-type metal-free phthalocyanine synthesized in Comparative Example 1 according to the following procedure. 1 part of the β-type metal-free phthalocyanine synthesized in Comparative Example 1 was dissolved little by little in 10 parts of 98% sulfuric acid kept at a temperature of at most 10° C. The resulting mixture was stirred for about 2 hours while keeping the temperature thereof at most 5° C. Subsequently, the resulting sulfuric acid solution was poured into 200 parts of iced water to precipitate crystals, which were then filtered off, washed with distilled water until stripped of the acid, and then dried to obtain 0.95 part of α-type metal-free phthalocyanine.

COMPARATIVE EXAMPLE 3

Preparation of τ-Type Metal-Free Phthalocyanine 10 parts of a-type metal-free phthalocyanine, 20 parts of a grinding assistant such as salt, Glauber's salt and other inorganic salt, and 8 parts of a solvent were placed into a sand mill to grind the phthalocyanine. During the course of the grinding, the phthalocyanine was sampled at given intervals to check the X-ray diffraction pattern thereof every time, since the phthalocyanine is liable to turn into β-type crystals when the grinding temperature is high. The grinding was effected at a temperature between 60° C. and 120° C. for a period of time of 7 hours to 15 hours. After the confirmation of conversion of the α-type metal-free phthalocyanine into a τ-type crystal form, the contents of the sand mill were collected from the sand mill, and then stripped of the grinding assistant and the solvent while using water and methanol. Thereafter, the crystals were purified with a 2% dilute aqueous solution of hydrochloric acid, filtered off, washed with water, and dried to obtain 8.5 parts of τ-type metal-free phthalocyanine.

COMPARATIVE EXAMPLE 4

Preparation of X-Type Metal Free Phthalocyanine 10 parts of α-type metal-free phthalocyanine were placed into a ball mill, and ground therewith for 150 hours. After the confirmation of conversion of the α-type metal-free phthalocyanine into an X-type crystal form, the resulting crystals were washed with water and methyl ethyl ketone (MEK), then purified with a 2% dilute aqueous solution of hydrochloric acid, filtered off, washed with water, and dried to obtain 8.7 parts of X-type metal-free phthalocyanine.

Production of Electrophotographic Photoconductors

The various crystal forms of metal-free phthalocyanine prepared in the foregoing Examples and Comparative Examples were used as charge-generating substances to produce respective electrophotographic photoconductors according to the following procedure, followed by evaluation thereof with respect to electrical properties and image properties. Additionally stated, the respective photoconductors will be identified hereinafter with the same indications of Examples or Comparative Examples as those of metal-free phthalocyanine.

Figure 3:
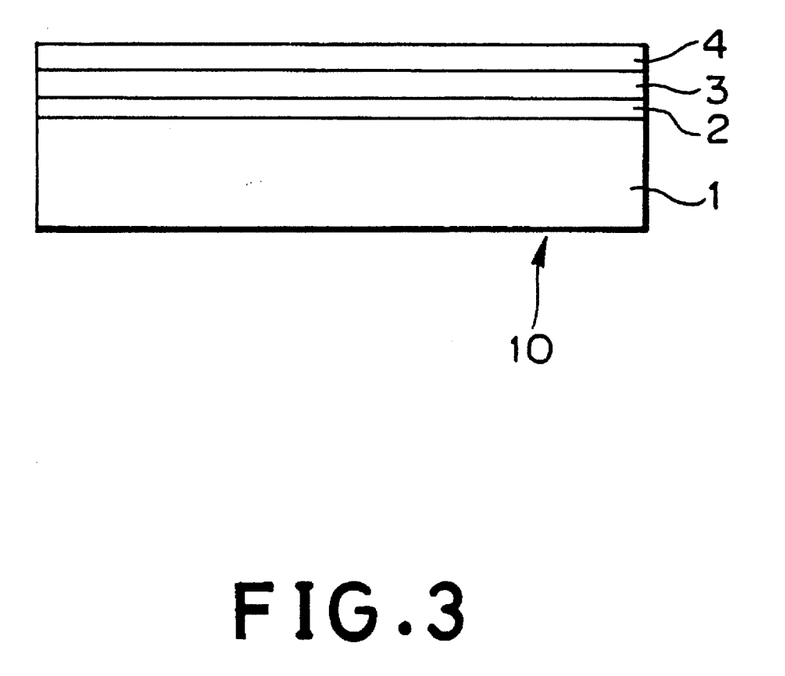
FIG. 3 is a schematic cross sectional view of the electrophotographic photoconductor of the present invention.

A flat plate photoconductor was produced using each charge-generating substance for evaluation of the electrical properties thereof. As shown in FIG. 3, a coating solution of 10 parts of a copolymer nylon R (AMILAN R CM-8000 manufactured by Toray Industries, Inc.) mixed with and dissolved in 190 parts of ethanol with a ball mill was applied on an aluminum substrate 1 with a wire bar coater, and then dried at a temperature of 100° C. for 1 hour to form an undercoating layer 2 having a thickness of 0.5 μm. On the other hand, 2 parts of each of the metal-free phthalocyanines prepared in Examples 2 and 4 and Comparative Examples 1, 2, 3 and 4 were dispersed in a resin solution of 2 parts of vinyl chloride-vinyl acetate copolymer resin (VMCH R manufactured by Union Carbide Corporation) dissolved in 97 parts of dioxane, while using a ball mill for 6 hours. The resulting dispersion was applied on the undercoating layer 2, and then dried at a temperature of 100° C. for 2 hours to form a charge generation layer 3 having a thickness of 0.3 μm. Subsequently, a coating solution of 10 parts of 1-phenyl-1,2,3,4-tetrahydro-quinoline-6-carboaldehyde-1,1'- diphenylhydrazone as a charge-transferring substance and 10 parts of a polycarbonate resin (PANLITE R K-1300 manufactured by Teijin Chemicals Ltd.) dissolved in 100 parts of methylene chloride was applied on the charge generation layer 3, and then dried to form a charge transfer layer 4 having a thickness of 15 μm. Thus, photoconductors 10 of Examples 2 and 4 and Comparative Examples 1, 2, 3 and 4 were produced.

The electrical properties were measured using an electrostatic recording paper testing apparatus Model SP-428 manufactured by Kawaguchi Denki Seisakusho K.K. The surface of each photoconductor was charged in the dark by corona discharge at a discharge voltage of −5.2 kV. After the termination of the corona discharge, the photoconductor was allowed to stand in the dark for 2 seconds, followed by measurement of the surface potential $V_0$ (V) thereof. Subsequently, the surface of the photoconductor was irradiated with a 5-lux white light to measure the length of time over which the surface potential $V_0$ was lowered to ½ thereof. The quantity of white light exposure for the half-life of the photoconductor (white light $E_{1/2}$) (lux·sec) was calculated as the sensitivity of the photoconductor to the white light from the above-mentioned length of time. The residual potential $V_{r3}$ (V) after 3 seconds of white light exposure was also measured. On the other hand, since the oscillation wavelength of a semiconductor laser for use in a general laser printer is in the range of 760 nm to 800 nm, the surface of the photoconductor having an adjusted surface potential of −600 V was irradiated with a light of 780 nm in wavelength as a monochromatic light emitted from a 500 W xenon lamp as a light source to measure the energy of light exposure required for lowering the surface potential to ½ of the original one (780-nm light $E_{1/2}$) (μJ/cm$^2$), which energy was evaluated as the sensitivity of the photoconductor to a light in the near infrared region. The results are shown in Table 1.

TABLE 1

| Photoconductor | Crystal Form of Metal-Free Phthalocyanine | V0 (V) | Vr3 (V) | White Light $E_{1/2}$ | 780 nm Light $E_{1/2}$ |
|---|---|---|---|---|---|
| Ex. 1 | FX-type | −600 | −5 | 0.85 | 0.25 |
| Ex. 4 | X-type | −603 | −20 | 1.2 | 0.42 |
| Comp. Ex. 1 | β-type | −600 | −110 | 8.2 | 6.1 |
| Comp. Ex. 2 | α-type | −300 | −165 | 15.2 | at least 10 |
| Comp. Ex. 3 | τ type | −605 | −10 | 1.0 | 0.38 |
| Comp. Ex. 4 | X-type | −580 | −30 | 1.5 | 0.58 |

As can be seen in Table 1, the photoconductor of Example 2 was superior in electrical properties, particularly in sensitivity to the white light as well as the 780 nm light, to the other photoconductors, clearly substantiating the superiority of the FX-type metal-free phthalocyanine of the present invention as a charge-generating substance. On the other hand, the photoconductor of Example 4 was better in properties than the photoconductor of Comparative Example 4, thus demonstrating that the X-type metal-free phthalocyanine prepared according to the process of the present invention is more suitable as a charge-generating substance than the X-type metal-free phthalocyanine prepared according to the conventional method.

A drum photoconductor was produced using each charge-generating substance for evaluation of the image properties thereof. The outer surface of an aluminum cylinder having an outer diameter of 30 mm was coated with an undercoating layer, a charge generation layer, and a charge transfer layer in this order by means of a dip coater according to substantially the same procedure as described above in connection with the production of the flat plate photoconductor to produce the drum photoconductor. The evaluation of the image properties were made using a printer remodeled from a commercially available semiconductor laser printer in such a way as to be capable of either irradiation or non-irradiation of the photoconductor with an erasure light. The results are shown in Table 2.

TABLE 2

| Photoconductor | Crystal Form of Metal-Free Phthalocyanine | Image Irradiated with Erasure Light | Image Not Irradiated with Erasure Light |
|---|---|---|---|
| EX. 2 | FX-type | free of memory | free of memory |
| Ex. 4 | X-type | free of memory | faint memorization |
| Comp. Ex. 1 | β-type | not imaged | not imaged |
| Comp. Ex. 2 | α-type | not imaged | not imaged |
| Comp. Ex. 3 | τ-type | free of memory | faint memorization |
| Comp. Ex. 4 | X-type | faint memorization | memorization |

As can be seen in Table 2, the photoconductors of Examples 2 and 4 and Comparative Example 3 were capable of securing a good image without memorization in the case of irradiation with the erasure light, whereas the photoconductor of Example 2 alone was free of memorization in the case of non-irradiation with the erasure light. On the other hand, the photoconductor of Comparative Example 4 involved memorization in the case of non-irradiation with the erasure light, and still involved faint memorization even in the case of irradiation with the erasure light, thus demonstrating that it was inferior to the photoconductor of Example 4.

According to the present invention, high-purity metal-free phthalocyanine can be easily prepared by heating phthalonitrile, an alkali metal or an alkali metal compound, and a hydrogen donor compound in an organic solvent to synthesize a partially hydrogenated alkali metal phthalocyanine, and subsequently bringing the product into contact with a dealkalizing agent to effect a hydrogen substitution reaction. Furthermore, various crystal forms of metal-free phthalocyanine, including an α-type crystal form, an X-type crystal form, and a novel FX-type crystal form of metal-free phthalocyanine according to the present invention, can be obtained by controlling the conditions of the hydrogen substitution reaction. Moreover, the α-type metal-free phthalocyanine obtained according to the process of the present invention, when milled, can be converted into FX-type metal-free phthalocyanine. On the other hand, the FX-type metal-free phthalocyanine obtained according to the process of the present invention can be used as a charge-generating substance to produce an electrophotographic photoconductor of high image quality which is highly sensitive to a light with a wavelength in the near infrared region such as the semiconductor laser radiation, and capable of forming output images free of defects such as a variation in the density thereof, a memory and a ghost. Further, the X-type metal-free phthalocyanine prepared according to the process of the present invention can be used as a charge-generating substance to produce an electrophotographic photoconductor more suitable for a light with a wavelength in the near infrared region such as the semiconductor laser radiation than the photoconductor using X-type metal-free phthalocyanine prepared according to a conventional process.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. Metal-free phthalocyanine: characterized in that the X-ray diffraction spectrum of said metal-free phthalocyanine as measured using CuKα as a radiation source includes intense diffraction peaks at Bragg angles (2θ±0.2°) of 7.5°, 9.0°, 16.6°, 17.2°, 21.5°, 22.2°, 23.8°, and 28.5°; and wherein the infrared absorption spectrum of said metal-free phthalocyanine includes four absorption bands with the maximum absorption intensity at a wavenumber of 716 $cm^{-1}$ between a wavenumber of 700 $cm^{-1}$ and a wavenumber of 760 $cm^{-1}$ and a characteristic absorption band at a wavenumber of 3,291±2 $cm^{-1}$.

* * * * *